United States Patent
Boyer, Jr. et al.

(10) Patent No.: US 7,247,182 B2
(45) Date of Patent: Jul. 24, 2007

(54) FILTER ASSEMBLY FOR A VACUUM CLEANER

(75) Inventors: Russell H. Boyer, Jr., Canton, OH (US); Jerry L. Balzer, North Canton, OH (US); Michael A. Durbin, Massillon, OH (US); Erik D. Lesco, Massillon, OH (US); Leron R. Thomas, North Canton, OH (US)

(73) Assignee: The Hoover Company, N. Canton, OH (US)

( * ) Notice: Subject to any disclaimer, the term of this patent is extended or adjusted under 35 U.S.C. 154(b) by 0 days.

(21) Appl. No.: 10/141,305

(22) Filed: May 8, 2002

(65) Prior Publication Data

US 2003/0208999 A1 Nov. 13, 2003

(51) Int. Cl.
*A47L 9/20* (2006.01)

(52) U.S. Cl. .............................. 55/429; 55/486; 55/503; 55/DIG. 3; 95/273; 95/287; 96/415; 15/352

(58) Field of Classification Search .................. 55/368, 55/413, 416, 439, 486, 498, 502, 524, 528, 55/DIG. 3, 429, 503; 15/347, 353, 350, 15/352; 95/273, 287; 96/415

See application file for complete search history.

(56) References Cited

U.S. PATENT DOCUMENTS

| | | | |
|---|---|---|---|
| 1,829,582 A | 10/1931 | Carson | |
| 3,618,158 A | 11/1971 | Worwag | |
| 3,621,640 A | 11/1971 | Ohno et al. | |
| 3,758,914 A | 9/1973 | Nupp et al. | |
| 4,724,574 A * | 2/1988 | Bowerman et al. | ............ 15/351 |
| 5,507,847 A * | 4/1996 | George et al. | ................ 55/486 |
| 5,690,713 A * | 11/1997 | Bowerman et al. | ...... 55/DIG. 3 |
| 5,829,090 A | 11/1998 | Melito et al. | |
| 5,863,309 A * | 1/1999 | Louis et al. | ............. 55/DIG. 3 |
| 5,961,676 A * | 10/1999 | King et al. | ............. 55/DIG. 3 |
| 6,070,291 A | 6/2000 | Bair et al. | |
| 6,125,501 A * | 10/2000 | Yip | ............................ 15/344 |
| 6,312,508 B1 * | 11/2001 | Alberts, III et al. | ..... 55/DIG. 3 |
| 6,334,881 B1 * | 1/2002 | Giannetta et al. | ............. 55/486 |
| 6,375,696 B2 * | 4/2002 | Wegelin et al. | .......... 55/DIG. 3 |
| 6,596,044 B1 * | 7/2003 | Bilek et al. | ............. 55/DIG. 3 |
| 6,598,263 B2 * | 7/2003 | Boles et al. | ............. 55/DIG. 3 |
| 6,875,255 B2 * | 4/2005 | Alford et al. | ................. 95/273 |
| 2002/0073663 A1 | 6/2002 | Sepke et al. | |

* cited by examiner

*Primary Examiner*—Duane Smith
*Assistant Examiner*—Minh-Chau T. Pham
(74) *Attorney, Agent, or Firm*—A. Burgess Lowe; John W. Morrison (57) ABSTRACT

A filter assembly for a removable dirt separation system is disclosed. The filter assembly includes a wall support attached to a wall of the dirt separation system and a screen panel having a number of screen elements. The filter assembly further includes a filter element which is selectively releasable from the screen panel. The screen panel and filter element can be selectively secured to the wall support. A fine particle separation chamber is at least partially defined by the screen elements and the filter element. A portion of the walls of a dirt cup within the dirt separation system is formed by the filter assembly. A method of operating a filter assembly for a removable dirt separation system is also disclosed.

18 Claims, 13 Drawing Sheets

FILTER ASSEMBLY FOR A VACUUM CLEANER

TECHNICAL FIELD

Generally, this invention relates to vacuum cleaners. In particular, the invention relates to a removable dirt separation system for a vacuum cleaner. Moreover, the invention relates to a filter assembly for a bagless vacuum cleaner.

BACKGROUND OF THE INVENTION

Upright vacuum cleaners are well known in the art. Typically, these vacuum cleaners include an upper housing pivotally mounted to a vacuum cleaner foot. The foot is formed with a nozzle opening defined in an underside thereof and may include an agitator mounted therein for loosening dirt and debris from a floor surface. A motor and fan may be mounted to either the foot or the housing for producing suction at the nozzle opening. The suction at the nozzle opening picks up the loosened dirt and debris and produces a flow of dirt-laden air which is ducted to the vacuum cleaner housing.

In conventional vacuum cleaners, the dirt laden air is ducted into a filter bag supported on or within the vacuum cleaner housing. Alternatively, bagless vacuum cleaners duct the flow of dirt-laden air into a dirt separation system having a dirt cup which filters the dirt particles from the airflow before exhausting the filtered airflow into the atmosphere. Various dirt separation systems have been used on bagless vacuum cleaners to separate the dirt particles from the airflow. For example, some vacuum cleaners have dirt cups with outer walls comprising a filter material. Locating the filter material along the outer walls has the distinct advantage of permitting the use of a large amount of filter material similar to the amount of material in a filter bag. However, such vacuum cleaners have a disadvantage of not permitting the operator to view the accumulated material within the dirt cup. Other vacuums, place the filter element in an interior portion of the dirt cup. Such dirt cups do not take advantage of the larger surface available on the outer wall of the dirt cup. In addition, placing the filter internally in the dirt cup does not allow the operator to view the filtered air flow which exits the filter. Additionally, other vacuum cleaners have a filter assembly comprising a filter screen and filter element forming a lid of the dirt cup. A disadvantage to this type of dirt cup is that the filter assembly must be removed to empty the accumulated particles in the dirt cup. An additional disadvantage to this type of dirt cup is that the fine particles which accumulate between the filter element and screen cannot be removed from the filter assembly without removing and disassembling the filter assembly.

What is needed therefore, is a dirt separation system that overcomes the above-mentioned drawbacks.

SUMMARY OF THE INVENTION

In accordance with a first aspect of the present invention, there is provided a filter assembly for a removable dirt separation system. The filter assembly includes a wall support attached to a wall of the dirt separation system and a screen panel having a number of screen elements. The filter assembly further includes a filter element which is selectively releasable from the screen panel. The screen panel and filter element can be selectively secured to the wall support. A fine particle separation chamber is at least partially defined by the screen elements and the filter element. A portion of the walls of a dirt cup within the dirt separation system is formed by the filter assembly.

In accordance with a second aspect of the present invention, there is provided a method of operating a filter assembly for a removable dirt separation system. The method includes the step of attaching a wall support to a wall of the dirt separation system. The method further includes the step of securing a screen panel having a number of screen elements to a filter element. The method still further includes the step of positioning the screen panel and filter element proximate to the wall support. The method yet further includes the step of forming a portion of the wall of a dirt cup within the dirt separation by a securing the screen panel and filter element to the wall support.

DETAILED DESCRIPTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
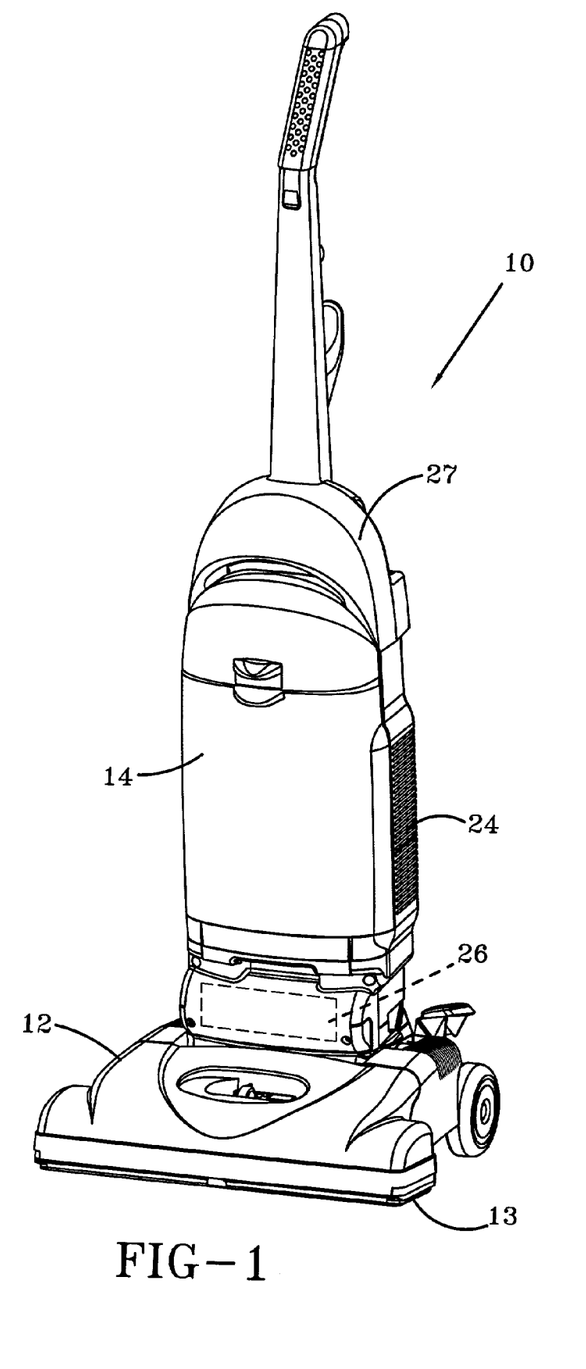
FIG. 1 is a perspective view of an upright vacuum cleaner which incorporates the features of the present invention therein.

Referring now to FIG. 1, there is shown an upright vacuum cleaner 10 which incorporates the features of the present invention therein. Vacuum cleaner 10 includes a vacuum cleaner foot 12 and a vacuum cleaner housing 14 pivotally connected to the foot 12. The foot 12 has a nozzle opening 13 formed in an underside thereof for suctioning of dirt particles from a floor surface. In addition, an agitator (not shown) may be provided within the nozzle opening to assist in removing dirt particles from the floor surface.

Figure 2:
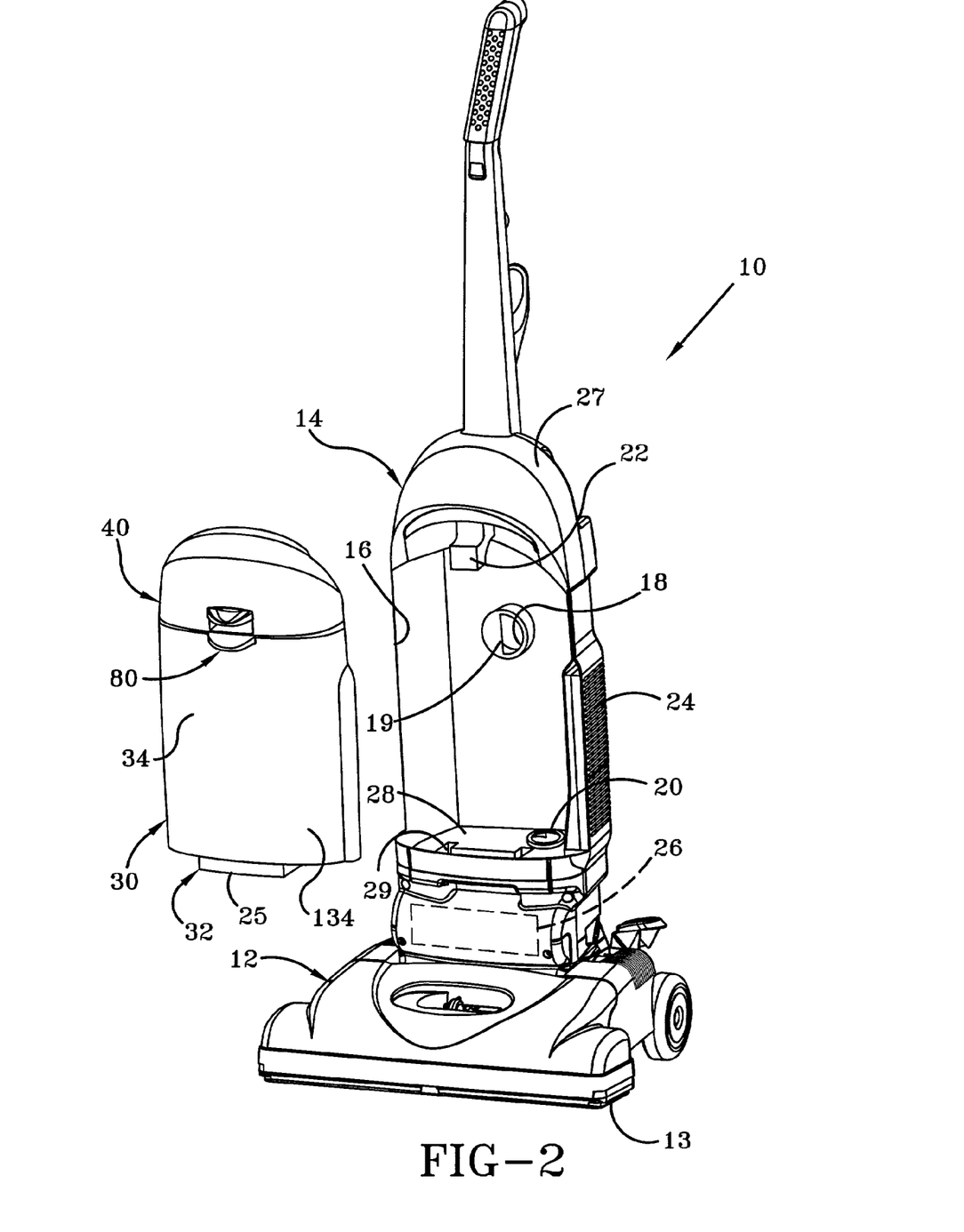
FIG. 2 is a perspective view similar to FIG. 1, but showing a dirt separation system removed from the vacuum cleaner.

Referring now to FIG. 2, there is shown the vacuum cleaner of FIG. 1, with a dirt separation system 30 removed from a cavity 16 formed within the housing 14. The cavity 16 may either be a bag housing formed to contain a conventional filter bag, an adaptation thereof, or a cavity specifically adapted to receive the dirt separation system 30. The cavity 16 has an inlet 18 in fluid communication with the nozzle opening 13 defined in the foot 12 and an outlet 20 for exhausting filtered air from the cavity 16. The inlet 18 further has a deflector 19 attached thereto to direct airflow within the dirt separation system 30.

A motor-fan unit 26 is positioned either in a lower portion of the housing 14 or the foot 12 and is adapted to generate an airflow from the nozzle opening 13 to the outlet 20. In one type of vacuum cleaner, the motor-fan unit 26 is positioned between the nozzle opening 13 and the inlet 18 such that the low pressure at the fan inlet creates a suction in the nozzle opening 13. This suction draws the loosened dirt from floor surface into nozzle opening 13 and creates a flow of dirt-laden air which travels through the motor-fan unit 26. The flow of dirt-laden air is blown upwardly through the inlet 18 through the dirt separation system 30, through the outlet 20 and exhausted from the vacuum cleaner 10. The air which reaches the motor-fan unit 26 has not been filtered either by the dirt separation system 30 or a bag prior to reaching the fan, hence these vacuum cleaners are generally referred to as "dirty air" units.

Alternatively, the motor-fan unit 26 may be positioned downstream from the outlet 20 such that the low pressure at the fan inlet creates a an airflow that draws low pressure air from the nozzle opening 13 to the outlet 20 via the inlet 18 and dirt separation system 30. The air which reaches the motor-fan unit has been filtered by the dirt separation system 30 prior to reaching the fan, hence these vacuums are generally referred to as "clean air" units. The air which exits the motor-fan unit 26 is then exhausted from the vacuum cleaner 10. It should be appreciated that the dirt separation system 30 may be used in either a dirty air unit or a clean air unit without deviating from the scope of the invention. Additionally, it is well known in the art to provide a final filter 24 for filtering the airflow prior to exhausting the airflow from the vacuum cleaner 10.

The vacuum cleaner housing 14 further includes a catch 22 which hangs down from an upper portion 27 of the housing 14. The catch 22 is adapted to cooperate with a latch assembly 80 of the dirt separation system 30 to secure the dirt separation system 30 to the upper housing 14. The details of the latch assembly 80 and lid assembly 40 are described in greater detail below in reference to FIGS. 6, 7A, 7B, 8A, 8B, and 8C.

The housing 14 further includes a base portion 28 having a U-shaped groove 29 defined therein. The U-shaped groove 29 cooperates with a U-shaped extension 32 which extends downwardly from the lower edge of the dirt separation system 30. A lateral portion 25 of the U-shaped extension 32 fits within the U-shaped slot 29 to provide front to rear location of the dirt separation system 30 relative to the housing 14. The longitudinal portions 31 (seen in FIGS. 5A and 5B) of the of the extension 32 provide left to right location of the dirt separation system 30 relative to the housing 14. It should be appreciated that the cooperation of the single U-shaped extension 32 with the single U-shaped groove 29 provides precise location of the dirt separation system 30 relative to the housing 14 both in a left to right orientation and a front to rear orientation.

Figure 3:
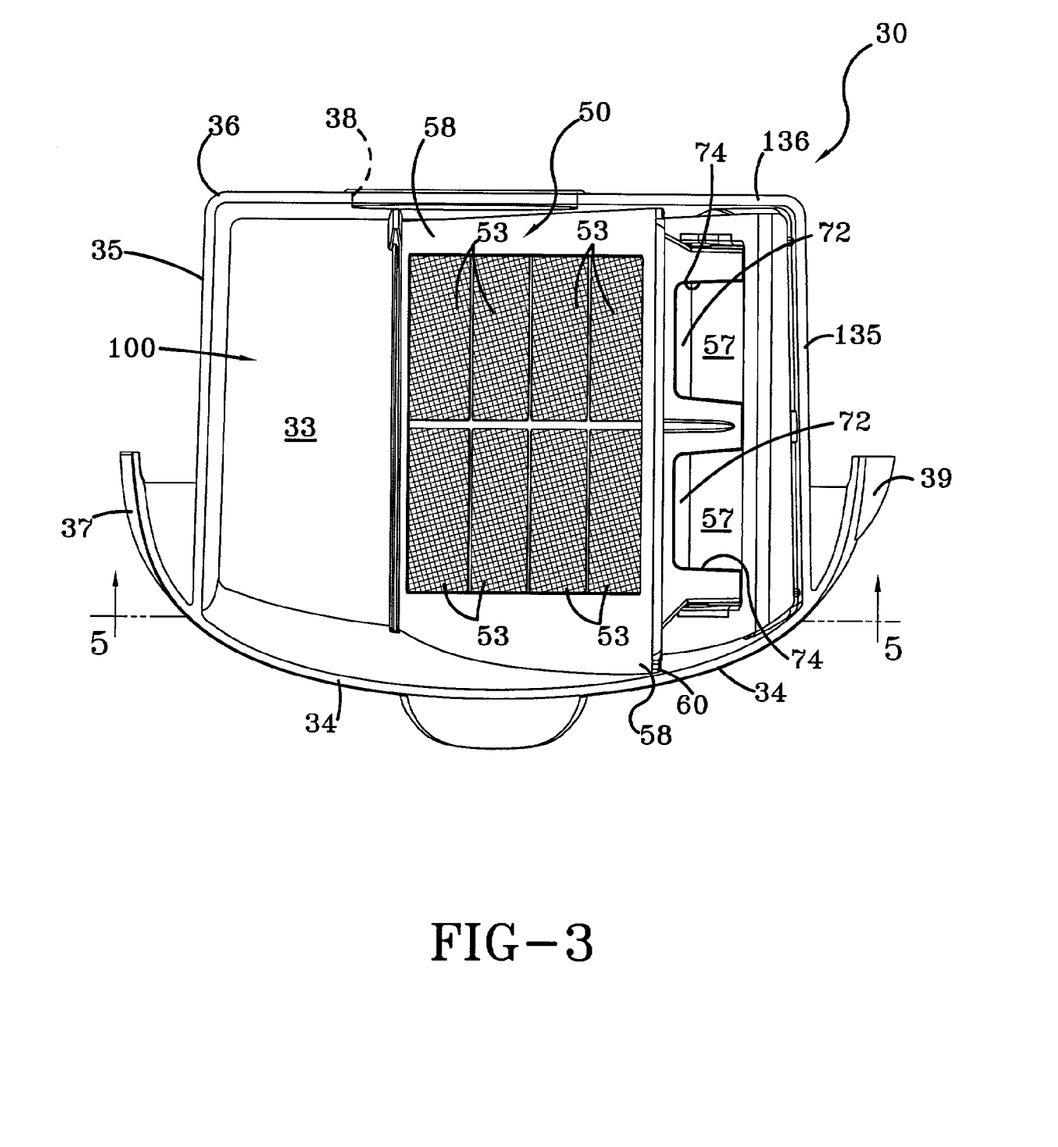
FIG. 3. is an top view of the dirt separation system of FIG. 2 with a lid assembly removed.

Referring now to FIG. 3, there is shown a top view of the dirt separation system 30 with a lid assembly 40 removed to show the interior of a dirt cup 100 defined within the dirt separation system 30. The dirt cup 100 is defined by a floor 33, a number of wall panels 34, 35, 36, and a filter assembly 50. An inlet opening 38 is defined in the wall panel 36 to allow the dirt laden airflow to enter the dirt separation system 30. While the filter assembly 50 is described herein as a single flat wall, the scope of this invention is intended to cover every configuration wherein the filter assembly 50 is used to form a first portion of the walls of the dirt cup 100 including circular walls, arcuate walls, triangular walls, flat walls, outwardly angled walls, inwardly angled walls and any combination thereof which are used to form a first portion of the walls of the dirt cup 100 within the removable dirt separation system 30. Additionally, it should be appreciated that floor 33 is not required to form the dirt cup 100 as angled walls, such as the filter assembly 50 could converge to form a dirt cup 100 without a floor.

It should be appreciated, that a second portion of the walls of the dirt cup, including the walls 34, 35, and 36 are translucent to allow for the viewing of material which may accumulate within the dirt cup 100. However, only a second portion, i.e. excluding the first portion formed by the filter assembly 50 need be translucent to allow for the viewing of the contents of the dirt cup 100. The dirt separation system 30 further includes translucent walls 134, 135 and 136 for viewing air which flows through filter assembly 50 and through a dirt duct 120 (shown in FIG. 5B). The dirt separation system 30 yet further includes a left lateral extension 37 and a right lateral extension 39 which may be used to manipulate the dirt separation system 30 when the dirt separation system 30 is removed from the housing 14 of the vacuum cleaner 10.

Figure 4A:
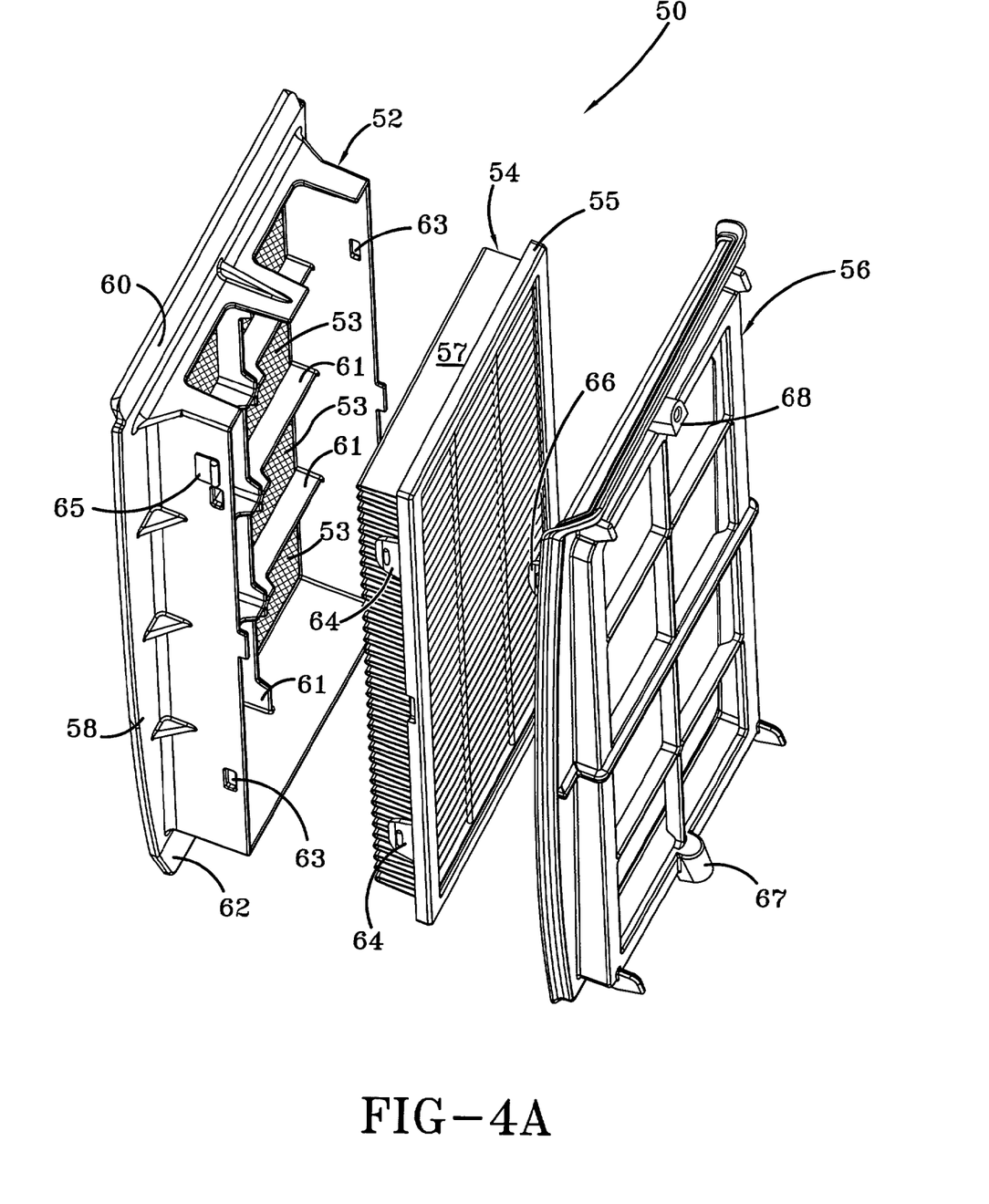
FIG. 4A. is a exploded perspective view of a filter assembly used in the dirt separation system of FIG. 3.

Referring now to FIG. 4A, there is shown an exploded view of the filter assembly 50 which forms a first portion of the side walls of the dirt cup 100 within the dirt separation system 30. The filter assembly 50 includes a screen panel 52, a filter element 54, and wall support 56. The screen panel 52 includes screen elements 53 which coarsely filter the dirt laden airflow which exit the dirt cup 100 (shown in FIG. 3) The screen panel 52 further includes lateral sealing members 58, an upper sealing member 60, a lower sealing member 62, and screen support members 61. The lateral sealing members 58 seal the filter panel to adjacent portions of the walls 34, 36 (shown in FIG. 3) which form the dirt cup 100 so as to prevent airflow from bypassing the screen elements 53. The upper sealing member 60 seals with the lid assembly 40 to seal the upper portion of the of the dirt cup 100 (shown in FIG. 5B). The lower sealing member 62 seals with the floor 33 (shown in FIG. 3) to seal the lower portion of the dirt cup 100.

The screen support members 61 provide structural support for screen elements 53. The screen elements 53 may be formed of a number of different materials such as metal or synthetic mesh or screens, cloth, foam, a high-density polyethylene material, apertured molded plastic or metal, or any other woven, non-woven, natural or synthetic coarse filtration materials without affecting the concept of the invention. In addition, the screen panel 52 includes a number of slots 63 adapted to receive an number of tabs 64 of the filter element 54. In addition, the screen panel 52 includes a pair of latching elements 65 adapted to engage an pair of hooks 66 (best seen in FIGS. 5A and 5B) defined in the wall support 56.

The filter element 54 includes a compressible sealing member 55 bonded to the outer edges of a filter material 57.

The filter material 57 provides a fine filtration of the dirt laden airflow which passes through the screen elements 53. The filter material 57 includes a first inner layer formed of a melt-blown polypropylene, a second middle layer formed of a spun-bond polyester and an outer third layer formed of an expanded polytetrafluoro-ethylene (ePTFE) membrane. The ePTFE outer layer provides non-stick properties to the filter material 57 and allows any dirt or dust accumulated on the filter element 54 to be easily displaced therefrom. Although the filter material 57 is shown and described as having three layers, it is understood that the filter material may include any number of layers or be formed of any number of materials such as a micro-glass or a melt-blown polyester without affecting the concept of the invention. The sealing member 55 includes the tabs, 64 which are adapted to be received within the slots 63 of the screen panel 52.

The wall support 56 includes the hooks 66 which are adapted to engage the latching members 65 of the screen panel 52. In addition, the wall support 56 includes screw bosses 67, 68 adapted to receive the fasteners, such a screws 60 and 70 (shown in FIGS. 5A and 5B) to secure the wall support 56 to the dirt separation system 30.

Figure 4B:
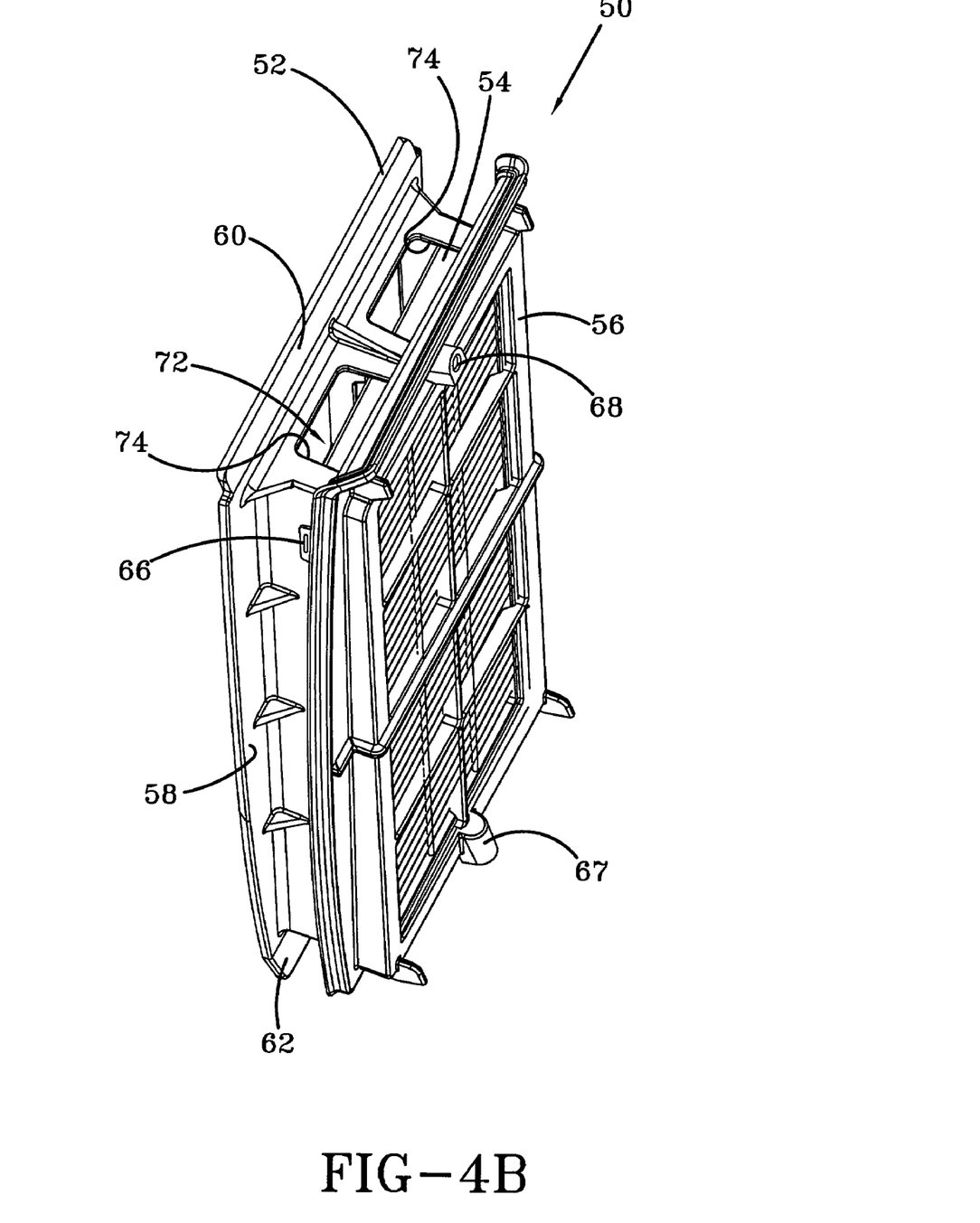
FIG. 4B is a perspective view of the assembled filter assembly of FIG. 4A.

Referring now to FIG. 4B, there is shown assembled filter assembly 50. It should be appreciated that the wall support 56 is secured to the structure of the dirt separation system 30, which is not shown in FIGS. 4A and 4B. To assemble the filter assembly 50, the screen panel 52 is first secured to the filter element 54 by engaging the tabs 64 of the filter element 54 to the slots 63 of the screen panel 52. To complete the assembly of the filter assembly 50, the combined screen panel 52 and filter element 54 is secured to the wall support 56 by engaging the latching members 65 of the screen panel 52 to the hooks 66 of the wall support 56. It should be appreciated that the screen panel 52, filter element 54, and wall support 56 are configured such that when the screen panel 52 is engaged with the wall support 56, the compressible sealing element 55 of the filter element 54 is compressed between the screen panel 52 and the wall support 56 to form a seal which prevents airflow from by-passing the filter material 57 of the filter element 54.

Once assembled, a fine particle separation chamber 72 is defined between the screen panel 52 and the filter element 54. In operation, fine particles which pass through the screen elements 53, but not through the filter material 57 are trapped within the fine particle separation chamber 72. A pair of fine particle exit openings 74 are defined through the assembled screen panel 52 and filter element 54. Fine particles may be emptied from the fine particle separation chamber 72 via the fine particle exit opening 74 without removing the filter assembly 50 from the dirt separation system 30. It should be appreciated that a lid assembly 40 seals the upper area 110 proximate the exit openings 74 to prevent fine particles from escaping the dirt separation system 30 during operation (see FIG. 5B).

Figure 5A:
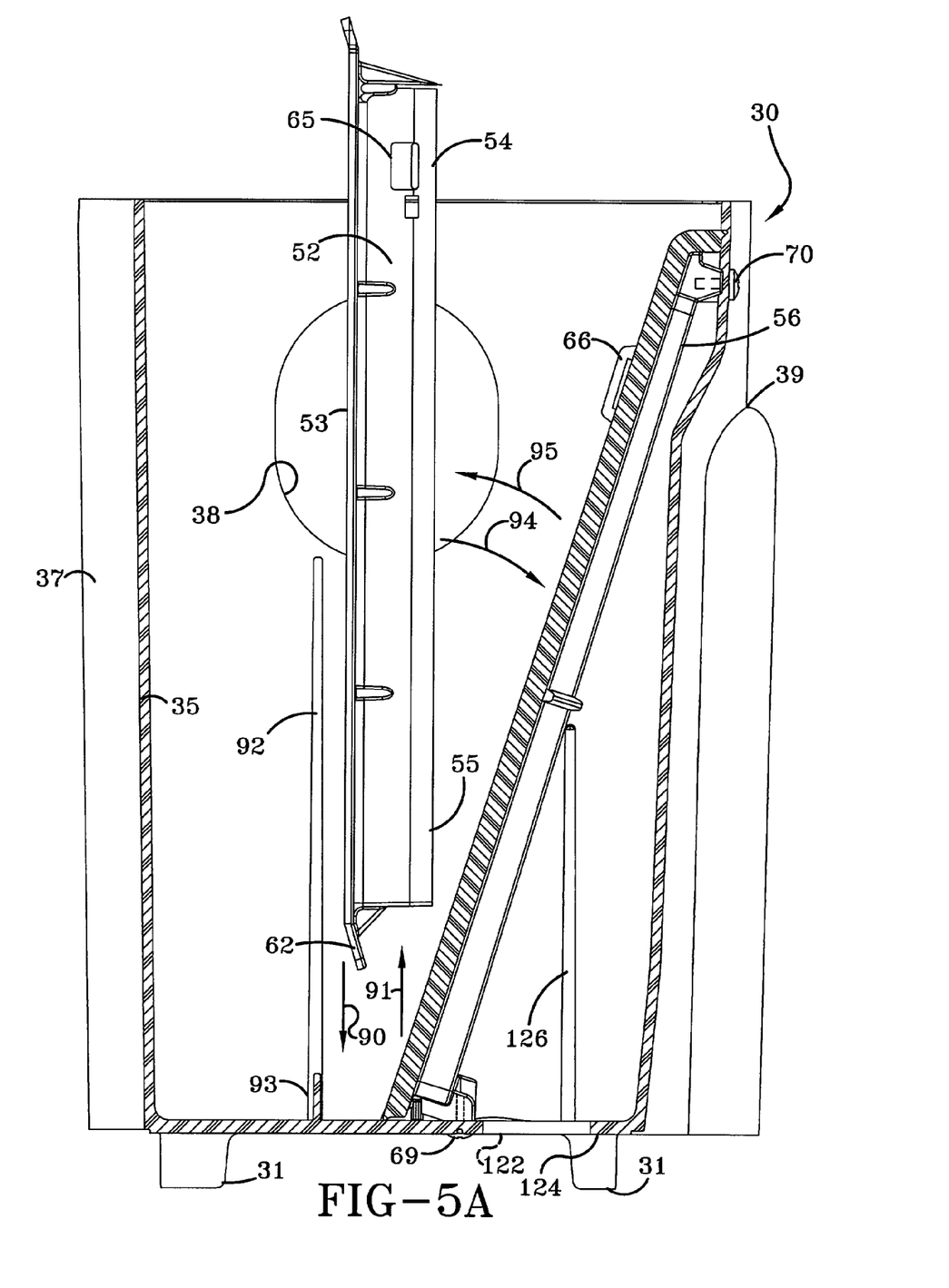
FIG. 5A is a cross-sectional view of the dirt separation system of FIG. 3, taken along the line 5-5 showing the filter assembly prior to installation in the dirt separation system.
Figure 5B:
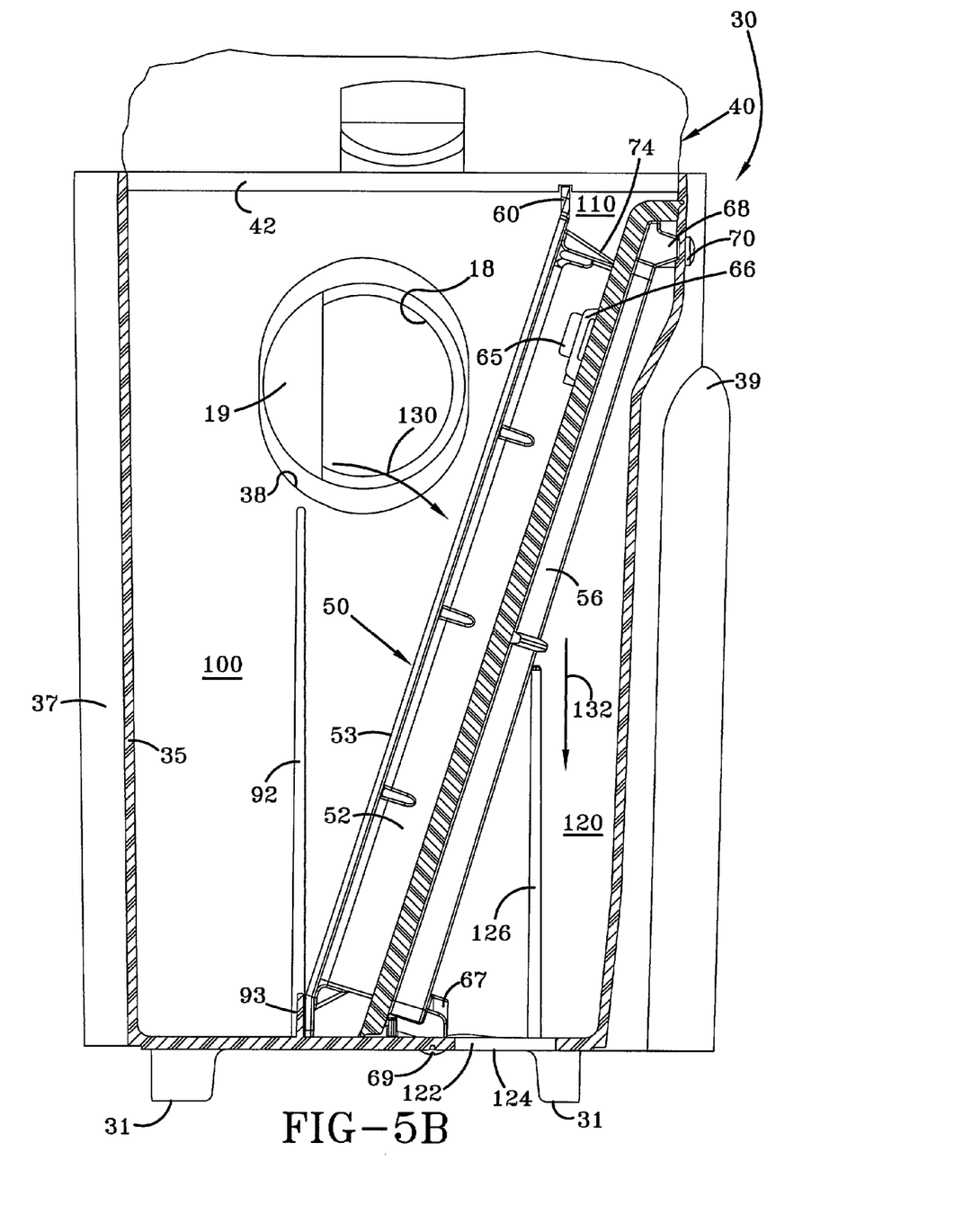
FIG. 5B is a view similar to FIG. 5A, but showing the filter assembly installed in the dirt separation system with the dirt separation system installed in the vacuum cleaner.

Referring now to FIG. 5A, there is shown a view of the assembled screen panel 52 and filter element 54 prior to being secured to the wall support 56 to form the filter assembly 50 within the dirt separation system 30. The assembled screen panel 52 and filter element 54 are slid downwardly into the dirt separation system 30 in the general direction of arrow 90. A guide rail 92 is provided within the dirt separation system 30 to allow lateral alignment of the assembled screen panel 52 and filter element 54 within the dirt separation system 30. Furthermore, an extension 93 of the guide rail 92 extends across the bottom of the dirt separation system 30 and cooperates with the lower sealing member 62 of the screen panel 52 to prevent particles from flowing around the screen elements 53 of the screen panel 52. Once the lower portion 62 has engaged the extension 93, the combined screen panel 52 and filter element 54 are secured to the wall support 56 by rotating the screen panel 52 and filter element 54 in the general direction of arrow 94. Rotation of the combined screen panel 52 and filter element 54 causes the latching members 65 of the screen panel 52 to engage the hooks 66 of the wall support 56 and secure the combined screen panel 52 and filter element 54 to the wall support 56 to form the filter assembly 50 (as shown in FIGS. 3 and 5B). It should be appreciated that rotating the combined screen panel 52 and filter element 54 against the wall support 56 compresses the compressible sealing element 55 between the screen panel 52 and the wall support 56. Compressing the sealing element 55 between the screen panel 52 and the wall support 56 seals the area around the filter material 57 and prevents airflow through the filter assembly 50 from bypassing the filter material 57 (as described above).

To remove the assembled screen panel 52 and filter element 54, the above described operation is reversed. The latching members 65 of the screen panel 52 are disengaged from the hooks 66 of the wall support 56. Disengaging the latching members 65 from the hooks 66 releases the compression on the sealing element 55 and allows the combined screen panel 52 and filter element 54 to be rotated back in the direction of arrow 95. The assembled screen panel 52 and filter element 54 can then be removed from the other components of the dirt separation system 30 by lifting the assembled screen panel 52 and filter element 54 out in the general direction of arrow 91. The filter element 54 may then be cleaned or replaced. To clean the filter element 54, the filter element 54 may be knocked against a waste container, brushed, or bent along its vertical or horizontal axis to dislodge any fine particles which may have accumulated on the filter material 57.

Referring now to FIG. 5B, there is shown the dirt separation system 30 fully assembled and positioned within the housing 14 as shown in FIG. 1, with the translucent front panels 34 and 134 removed for clarity of description. It should be appreciated that the filter assembly 50 divides the dirt separation system 30 into the dirt cup 100 and the dirt duct 120. The dirt duct 120 directs the airflow which exits the filter assembly 50 toward an exit opening 122 defined in an orifice plate 124 at the bottom of the dirt separation system 30. In addition, a flow directing vane 126 helps direct the air from the filter assembly 50 to the exit opening 122. In addition to its flow directing function, the vane 126 provides support to the center of the wall support 56 to reduce deflection of the filter assembly 50 during operation.

The dirt cup 100 is generally defined by the walls 34, 35, and 36 along with the floor 33 and the screen panel 52 of the filter assembly 50 (as shown in FIG. 3) whereas the dirt duct 120 is generally defined by the walls 134, 135, and 136 and the wall support 56 of the filter assembly 50. The wall 34 forms a first translucent viewing panel for viewing the material which accumulates within the dirt cup 100 whereas the wall 134 forms a second translucent viewing panel for viewing the filtered air flow which exits the filtered assembly 50 and flows through the dirt duct 120. In the embodiment shown, the second translucent viewing panel 134 is an extension of the first translucent viewing panel 34. In addition, the translucent walls 34, 35, 36, 134, 135, and 136 maybe be formed out of continuous translucent panel.

It should be appreciated that the dirt duct 120 could be formed to either side, or rear of the dirt cup 100, or on multiple sides if more than one portion of the walls the dirt cup 100 were defined by the filter assembly 50. Such a dirt duct could encompass the entire area around the dirt cup 100 and direct air to an exit of the dirt separation system 30. Such an exit may be defined on any outer surface of the dirt separation system, including but not limited to the bottom, sides, rear, front, lid or combination thereof.

The lid assembly 40 prevents air from exiting from an upper opening of the dirt cup 100. In particular, a lid element 42 seals the upper opening of the dirt cup 100. The upper opening of the dirt cup is defined by the upper portion of the walls 34, 35, and 36 along with the upper sealing member 60 of the screen panel 52 (see FIG. 3). In addition, the lid element 42 seals the area 110 above the filter assembly 50. The area 110 is in fluid communication with the fine particle separation chamber 72 (see FIG. 3) via the fine particle exit openings 74. Thus, the lid element 42 seals both the dirt cup 100 and the fine particle separation chamber 72 to prevent larger particles from exiting the dirt cup 100 and smaller particles from exiting the fine particle separation chamber 72.

In operation, the dirt separation system 30 takes a dirt laden airflow from the inlet 18, through the inlet opening 38 generally in the direction of arrow 130. This dirt laden airflow is directed toward the filter assembly 50 by the deflector 19 of the inlet 18. The deflector 19 could also be incorporated into the dirt separation system 30. Directing the airflow toward the filter assembly 50 increases the pressure at the screen panel 53 which increases airflow through the filter assembly 50. In addition, directing the airflow toward the screen panels 53 of the filter assembly 50 helps to remove large particles which may accumulate on the screen panels 53 and block airflow into the filter assembly 50. Additionally, because the dirt-laden air stream is flowing from the confined area of the inlet 18 into the relatively large area of the cup 100, the dirt cup 100 acts like an expansion chamber where the airflow expands and reduces its velocity. This expansion and reduced velocity allows the relatively heavy dirt particles and other relatively heavy debris to separate and fall from the dirt laden airflow. These large particles collect in the dirt cup 100 whereas the fine particles are directed through the screen elements 53 of the screen panel 52.

The dirt laden airflow is then directed through the filter material 57 where the fine particles are filtered out. These fine particles are then collected within the fine particle separation chamber 72. After passing through the filter material 57, the filtered airflow exits the filter assembly 50 in the general direction of arrow 132 in the duct 120 toward the outlet opening 122. The flow directing vane 126 assists in directing the filtered airflow in the duct 120 toward the exit opening 122. It should be appreciated that one advantage of the present invention is that the filtered airflow in the duct 120 may be viewed via the second translucent panel 134.

To empty the accumulated dirt from the dirt separation system 30, the dirt separation system 30 is removed from the housing 14 of the vacuum cleaner 10, as shown in FIG. 2. The lid assembly 40 is then removed to unseal the upper opening of the dirt cup 100 and area 110. The dirt separation system 30 may then be inverted by either grasping the right extension 37 or the left extension 39. Once inverted, coarse particles in the dirt cup 100 will fall from the dirt cup 100 via the upper opening and fine particles will fall from the fine particle separation chamber 72 via the fine particle exit openings 74 (See FIG. 3). The filter assembly 50 may also be removed and disassembled to further remove particles from the filter assembly 50 as described above.

Figure 6:
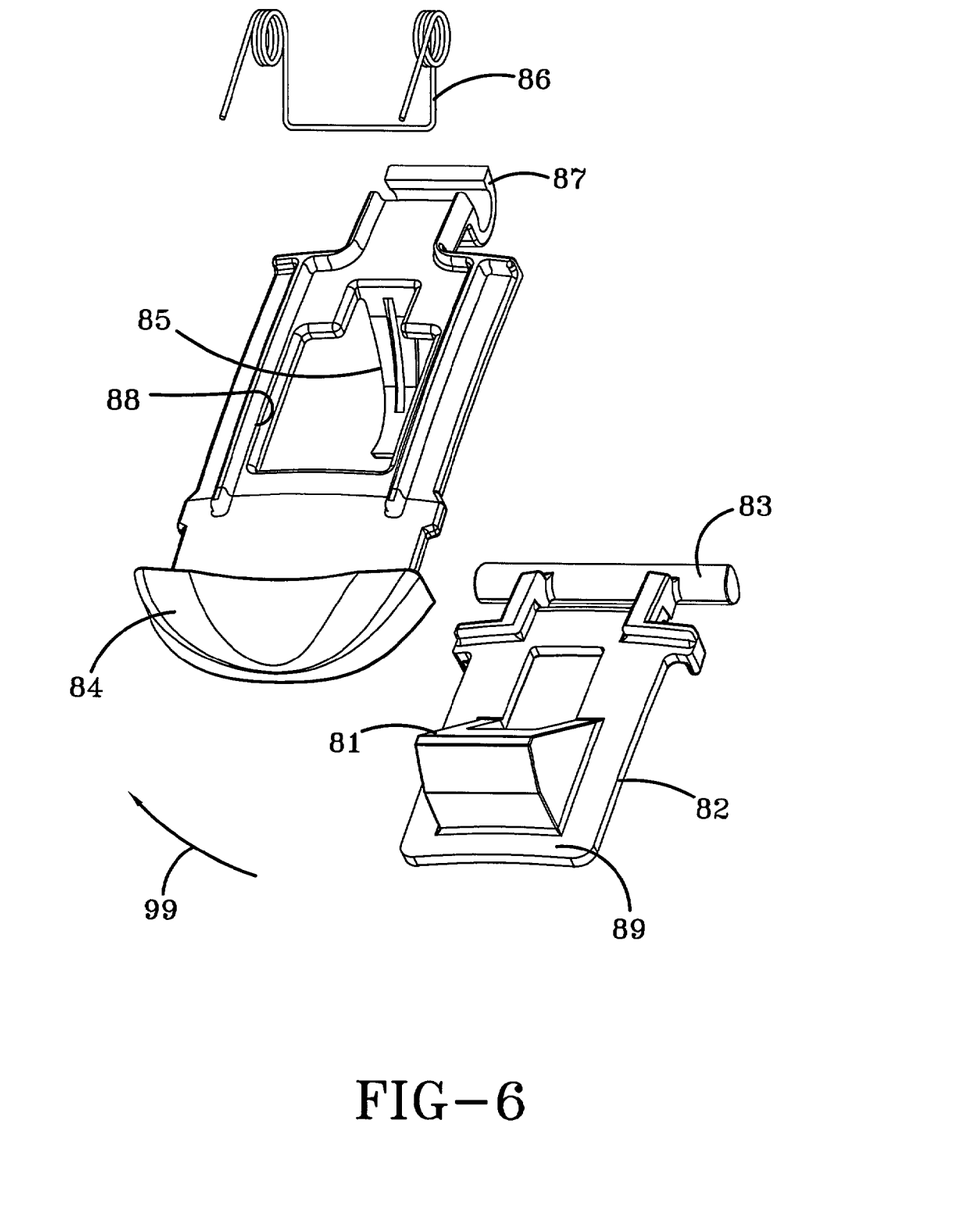
FIG. 6 is an exploded view of the components of the latch assembly positioned within the lid assembly of FIG. 7A.
Figure 7A:
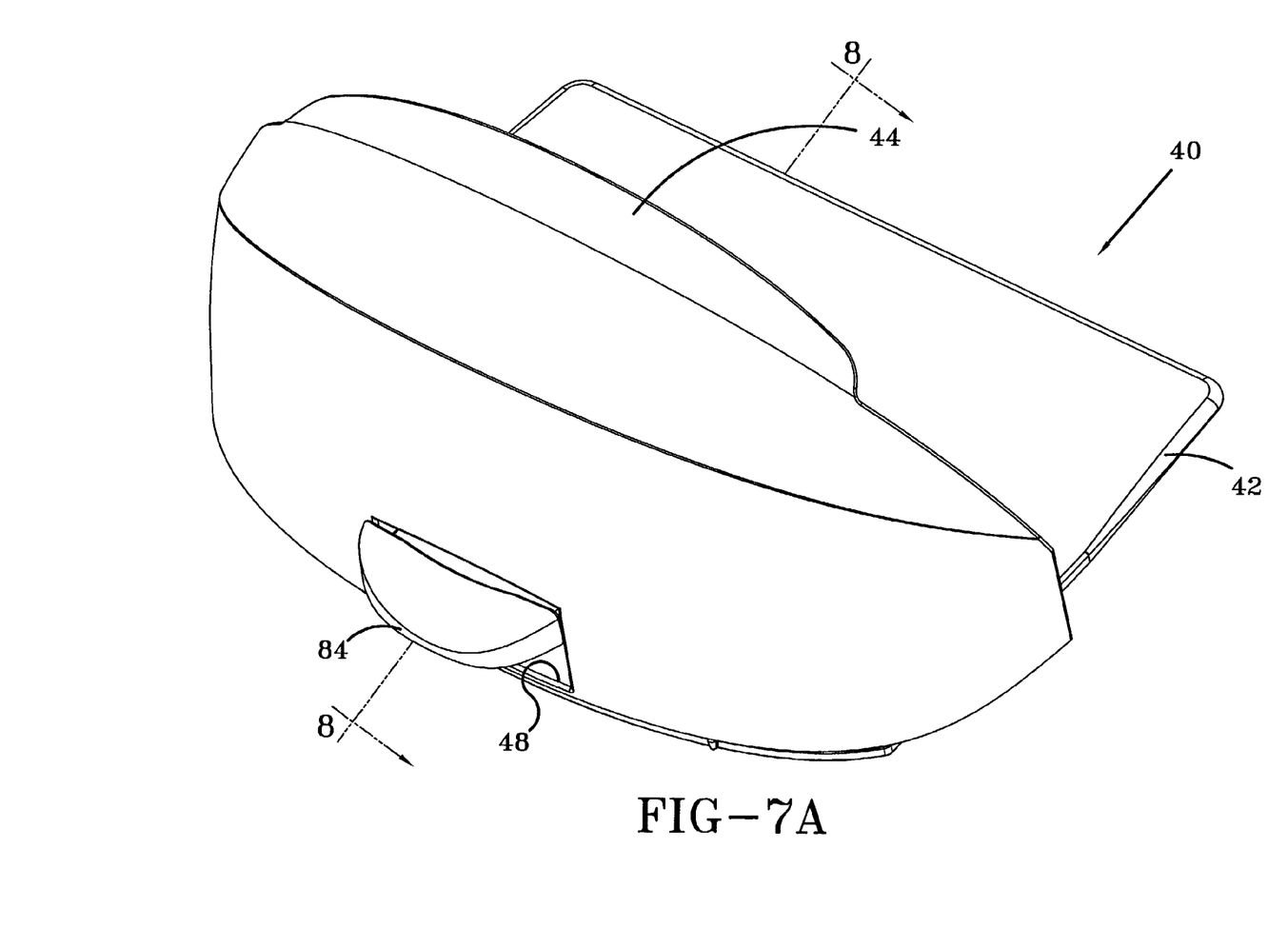
FIG. 7A is an enlarged view of the lid assembly of the dirt separation system of FIG. 2.
Figure 7B:
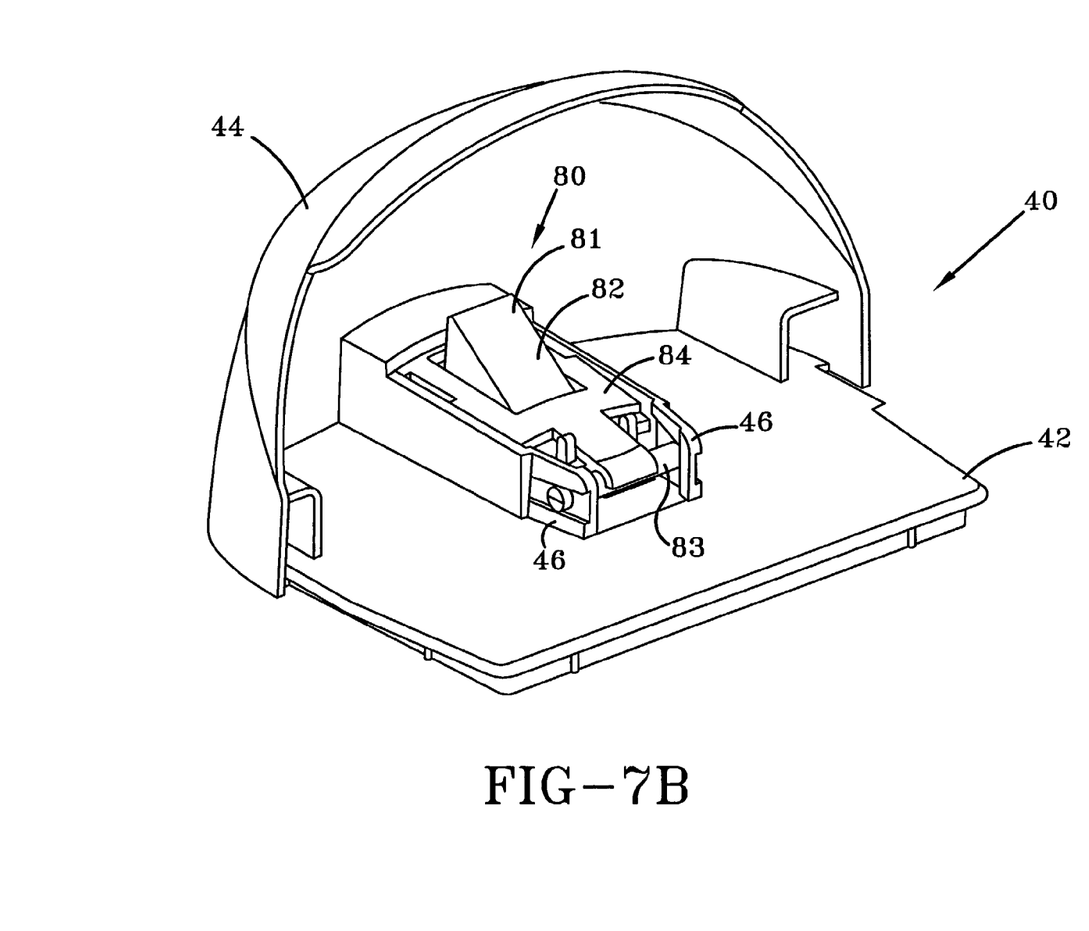
FIG. 7B is a rear view perspective view of the lid assembly of FIG. 6A.

Referring now to FIG. 6, there is shown an exploded view of the latch assembly 80 which is positioned within the lid assembly 40 (see FIGS. 7A and 7B). The latch assembly 80 includes a latch 82, an actuator 84 and a biasing spring 86. The latch 82 includes a latching surface 81 and an axle 83 integrally formed therewith. The latching surface 81 is the interface between the latch 82 and the catch 22 (see FIG. 2) of the housing 14. The axle 83 serves a pivot point for the latch 82. The actuator 84 has a living spring 85 integrally formed therein which biases the actuator in the general direction of arrow 99. The actuator 84 further has a sleeve 87 integrally formed therein which is adapted to fit around the axle 83 and allow rotation of the actuator about the axle 83. The actuator 84 further has a latch opening 88 defined therethrough operable to allow the latching surface 81 to pass through, but prevents a lower portion 89 of the latch 82 from passing through the. latch opening 88 of the actuator 84.

Figure 8A:
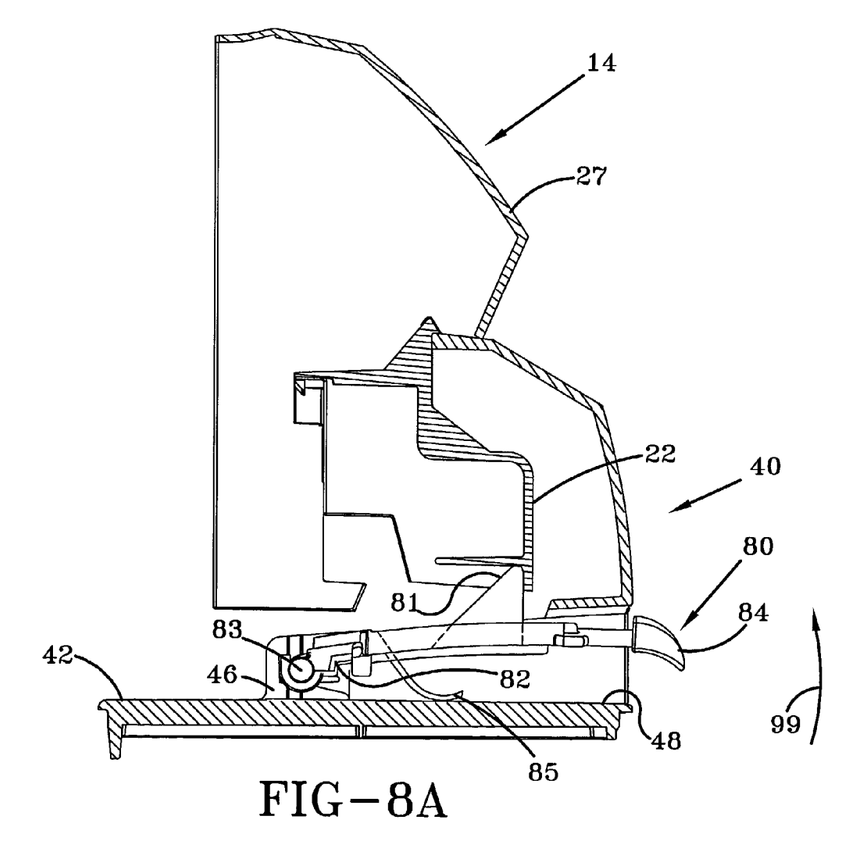
FIG. 8A is cross-sectional view of the lid of FIG. 7A taken along the line 8-8 showing the latch assembly in an unlatched position.
Figure 8B:
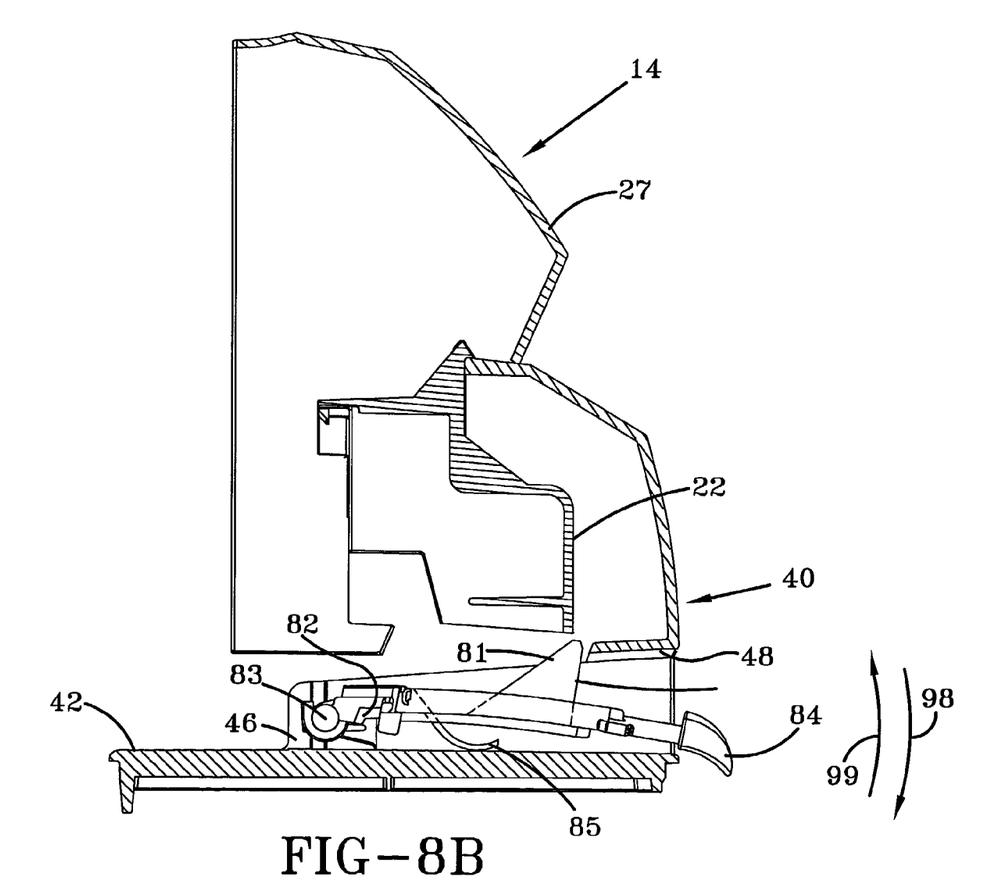
FIG. 8B is a view similar to FIG. 8A, but showing the latch assembly in an unlatched position.

Referring now to FIGS. 8A and 8B, there is shown the lid assembly 40 of the dirt separation system 30. The lid assembly 40 includes a lid element 42, a cover 44, and a latch assembly 80. The lid element 42 seals the upper opening of the dirt cup 100 and the area 110 as described above. The cover 44 cosmetically covers an upper portion of the cavity 16 proximate to the catch 22, as shown in FIG. 2. The latch assembly 80 is operable to selectively secure the lid assembly 40, and thus the dirt separation system 30, to the housing 14. The lid assembly 40 further includes a pair of axle supports 46 to support the axle 83 of the latch 82. The cover 44 further includes an actuator opening 48 defined therethrough.

To assemble the latch assembly 80 within the lid assembly 40, the actuator 84 is secured to the latch 82 by placing the sleeve 87 of the actuator 84 about the axle 83 of the latch 82 and further placing the latching surface 81 through the latch opening 88 defined in the actuator 84. The coils of the spring 86 are then slid over each end of the axle 83. The assembled latch assembly is then slid through the actuator opening 48, shown in FIG. 7A, until the axle 83 engages the axle supports 46, shown in FIG. 7B. Engaging the axle 83 to the axle supports 46 secures the latch assembly 80 to the lid assembly 40.

Referring now to FIG. 8A, there is shown the latch assembly 80 in a latched position wherein the latch 82 secures the lid assembly 40 to the housing 14. The spring member 86 acts against the latch 85 and the lid member 42 to bias the latching member in the general direction of arrow 99. This biasing force of the spring 86 maintains the latching surface 81 of the latch 82 against the catch 22 thereby securing the lid assembly 40 to the housing 14. The living spring 85 acts against the lid member 42 to bias the actuator 84 in the general direction of arrow 99. It should be appreciated, that the biasing force of the living spring 85 is not transferred to the latch 82 as the actuator 84 is positioned above the latch 84 and the latching surface 81 extends through the latch opening 88 defined in the actuator 84, as shown in FIG. 7B.

Referring now to FIG. 8B, there is shown the latch assembly 80 in an unlatched position wherein the lid assembly is released from the housing 14. To place the latch assembly in the unlatched position, the actuator 84 is rotated in the general direction of arrow 98 about the axle 83. Depressing the actuator 84 in the general direction of arrow 98 overcomes the biasing force of the living spring 85 and moves the actuator 84 into contact with the latch 82. Further depression of the actuator 84 overcomes the biasing force of the spring 86 and causes the latch 82 rotate in the general direction of arrow 98 about the axle 83. As the latch 82 rotates in the general direction of arrow 98, the latching surface 81 is moved out of contact with the catch 22 thereby releasing the lid assembly 40 from the housing 14. Releasing the lid assembly 40 from the housing 14 allows the dirt separation system 30 to be removed from the housing 14, as shown in FIG. 2.

Figure 8C:
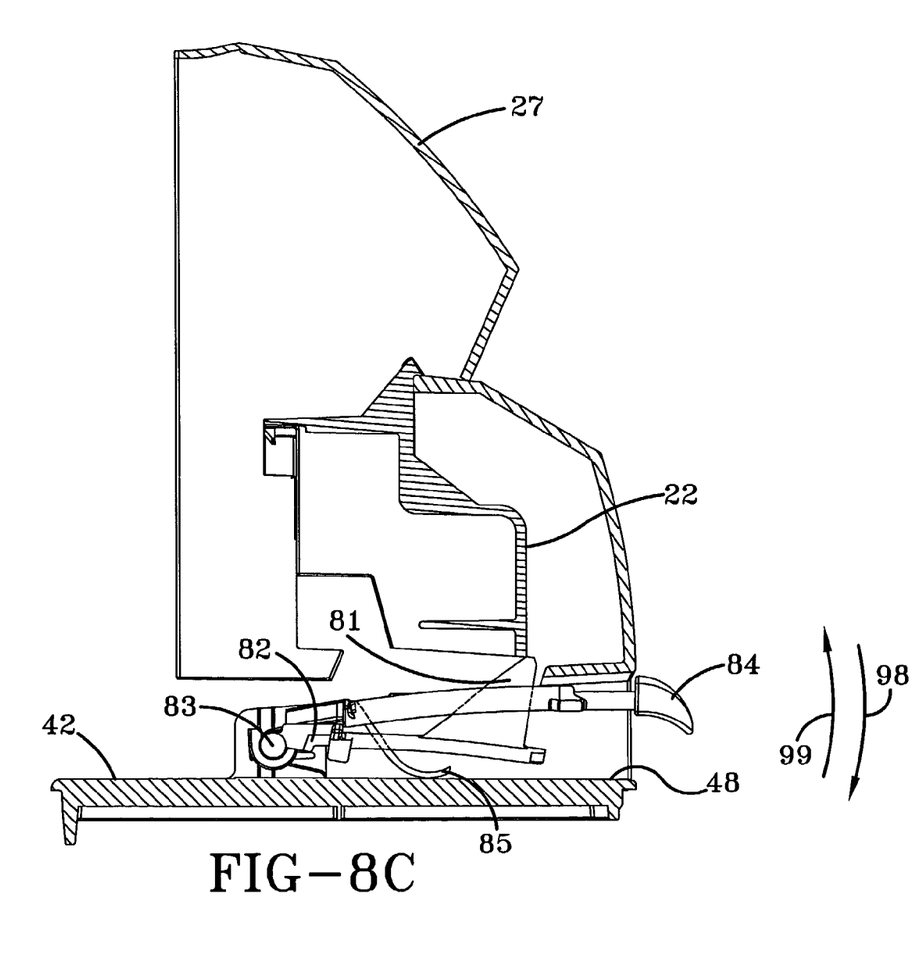
FIG. 8C is a view similar to FIG. 8B, but showing the latch assembly in a return position.

Referring now to FIG. 8C, there is shown the latch assembly 80 in a return position wherein the lid assembly 40 is returned to the housing 14, prior to reaching the latched position of FIG. 8A. To place the latch assembly in the return position, the dirt separation system 30, including the lid assembly 40 is rotated back into the housing 14. The latch 82 is moved into contact with the catch 22, overcoming the biasing force of the spring 86 to cause the latch 82 to rotate in the general direction of arrow 98. Rotating the latch 82 in the general direction of arrow 98 allows the latch 82 to move past the catch 22 and return to the latched position shown in FIG. 8A. It should be appreciated that moving the latch 82 into contact with the catch 22 does not cause the actuator 84 to rotate in the general direction of arrow 98. Because the actuator 84 does not rotate, a pinch point is not created in the actuator opening 48 between the actuator 84 and the lid 42.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

The invention claimed is:

1. A filter assembly for a vacuum cleaning, comprising:
a dirt cup having a number of walls;
a support secured to a wall of the dirt cup;
a fine particle collection chamber defined at least partially by a filter element and a screen panel upstream from the filter element;
a coarse particle collection chamber defined at least partially by the screen panel and walls of the dirt cup when the screen panel is secured to the dirt cup;
a fine particle exit opening in fluid communication with an upper portion of the fine particle collection chamber, wherein:
fine particles are removable from the fine particle collection chamber via the fine particle exit opening by inverting the dirt cup;
fine particles are removable from the dirt separation system by removing the fine particle separation chamber from the dirt cup; and
fine particles are movable to the coarse particle collection chamber by disassembling the fine particle collection chamber within the dirt cup.

2. The filter assembly of claim 1, further comprising:
a number of slots defined in the screen panel; and
a number of tabs on the filter element,
wherein engaging the slots to the tabs secures the filter element to the screen panel.

3. The filter assembly of claim 1, the filter element further comprising:
a compressible sealing member; and
a filter material,
wherein the filter material is bonded to the sealing member.

4. The filter assembly of claim 3, wherein the filter material includes a layer of expanded polytetrafluoroethylene (ePTFE).

5. The filter assembly of claim 3, wherein securing the screen panel to the wall support compresses the sealing member between the screen panel and the wall support to prevent airflow around the filter material.

6. The filter assembly of claim 5, further comprising:
a number of latching members secured to the screen panel; and
a number of hooks secured to the wall support,
wherein securing the latching members to the hooks secures the screen panel to the wall support.

7. The filter assembly of claim 1, wherein:
the dirt cup further includes a vane to direct airflow which exits the fine particle collection chamber, and
the vane supports a portion of the wall support.

8. The filter assembly of claim 1, wherein:
the dirt cup further includes a guide rail for positioning the screen panel, and
the guide rail seals with a lower sealing member of the screen panel to prevent airflow from flowing around the screen elements of the screen panel.

9. The filter assembly of claim 8, wherein the screen panel is rotated against the guide rail to position the screen panel against the wall support.

10. A method of operating a filter assembly for a vacuum cleaner, comprising the steps of:
attaching a wall support to a wall of a dirt cup;
securing a screen panel having a number of screen elements to a filter element to form a fine particle separation chamber;
positioning the screen panel and filter element proximate to the wall support;
forming a portion of the wall of a coarse particle separation chamber by securing the screen panel and filter element to the wall support;
separating coarse particles from a stream of dirt laden air entering said dirt cup with said screen panel and separating fine particles from said dirt laden air with said filter element;
collecting said coarse particles in said coarse particle separation chamber and collecting said fine particles in said fine particle separation chamber;
providing a fine particle exit opening in fluid communication with an upper portion of the fine particle separation chamber; and
emptying the contents of the fine particle separation chamber via the fine particle exit opening.

11. The method of claim 10, the securing step further comprising the step of engaging a number of slots defined in the screen panel to a number of tabs on the filter element.

12. The method of claim 10, the forming step further comprising the steps of:
compressing a compressible sealing member of the filter element between the wall support and the screen panel; and
sealing airflow from flowing around a filter material of the filter element.

13. The method of claim 11, the forming step further comprising the step of securing a number of latching members of the screen panel to a number of hooks of the wall support.

14. The method of claim 10, further comprising the step of supporting the wall support with a flow directing vane.

15. The method of claim 10, the positioning step further comprising the steps of guiding the screen panel into position with guide rails.

16. The method of claim 15, the positioning step further comprising the step of sealing the lower screen panel against the guide rail to prevent airflow from flowing around the screen elements of the screen panel.

17. The method of claim 16, the positioning step further including the step of rotating the screen panel against a lower portion of the guide rail.

18. A filter assembly for a vacuum cleaning apparatus comprising:
  a dirt cup adapted to receive dirt laden air from the vacuum cleaning apparatus;
  a screen panel supported in said dirt cup defining a coarse particle collection chamber;
  a filter element located downstream of said screen panel and attachable thereto to define a fine particle collection chamber, wherein said filter element is detachable from said screen panel within said dirt cup to empty said fine particle collection chamber into said coarse particle collection chamber; and
  said conjoined screen panel and filter element are removable from said dirt cup to empty said fine particle collection chamber outside of said dirt cup;
  wherein said fine particle collection chamber defines a fine particle exit opening upwardly, wherein said dirt cup is invertible to empty said fine particle collection chamber via said fine particle exit.

* * * * *